United States Patent
Roo

(10) Patent No.: US 8,452,001 B1
(45) Date of Patent: *May 28, 2013

(54) CLASS A-B LINE DRIVER FOR GIGABIT ETHERNET

(75) Inventor: Pierte Roo, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 232 days.

This patent is subject to a terminal disclaimer.

(21) Appl. No.: 12/950,722

(22) Filed: Nov. 19, 2010

Related U.S. Application Data

(63) Continuation of application No. 11/067,749, filed on Mar. 1, 2005, now Pat. No. 7,839,994.

(51) Int. Cl.
*H04M 1/00* (2006.01)
*H04M 9/00* (2006.01)

(52) U.S. Cl.
USPC .................................................. 379/399.01

(58) Field of Classification Search
USPC .................................................. 379/399.01
See application file for complete search history.

(56) References Cited

U.S. PATENT DOCUMENTS

| | | | |
|---|---|---|---|
| 3,986,131 A | 10/1976 | Ross et al. |
| 4,092,613 A | 5/1978 | Boubouleix |
| 4,160,216 A | 7/1979 | Thornton |
| 4,295,101 A | 10/1981 | Leidich |
| 4,296,382 A | 10/1981 | Hoover |
| 4,335,360 A | 6/1982 | Hoover |
| 4,415,865 A | 11/1983 | Gustafsson |
| 4,419,631 A | 12/1983 | Bertails et al. |
| 4,458,213 A | 7/1984 | Quan |
| 4,491,804 A | 1/1985 | Main |
| 4,529,948 A | 7/1985 | Bingham |
| 4,570,128 A | 2/1986 | Monticelli |
| 4,587,491 A | 5/1986 | Koterasawa |
| 4,607,233 A | 8/1986 | Van Tuijl |
| 4,682,119 A | 7/1987 | Michel |
| 4,752,745 A | 6/1988 | Pass |
| 4,814,723 A | 3/1989 | Botti |
| 4,970,471 A | 11/1990 | Taylor |
| 4,999,586 A | 3/1991 | Meyer |
| 5,039,953 A | 8/1991 | Su |
| 5,057,789 A | 10/1991 | Nagaraj |
| 5,148,120 A | 9/1992 | Kano et al. |
| 5,294,892 A | 3/1994 | Ryat |
| 5,334,950 A | 8/1994 | Arimoto |
| 5,337,007 A | 8/1994 | Barrett et al. |
| 5,382,838 A | 1/1995 | Sasaki et al. |

(Continued)

OTHER PUBLICATIONS

IEEE Standards B02.3ab, Mar. 8, 2002, pp. 147-249.

(Continued)

*Primary Examiner* — Alexander Jamal

(57) ABSTRACT

A line driver including a first driver circuit, a second driver circuit, and a first summing circuit. The first driver circuit generates a first component signal having a first polarity based on a first transmit signal, the bias signal, and the offset signal. The second driver circuit generates a second component signal having a second polarity based on a second transmit signal, the bias signal, and the offset signal. The first summing circuit sums the first and second component signals to generate a first differential signal. A first average current of the first differential signal for multiple symbols is greater than a second average current of a second differential signal for the symbols. The second differential signal is generated by summing a first biased signal and a second biased signal.

20 Claims, 9 Drawing Sheets

U.S. PATENT DOCUMENTS

| | | | |
|---|---|---|---|
| 5,412,344 A | 5/1995 | Franck |
| 5,426,641 A | 6/1995 | Afrashteh et al. |
| 5,442,319 A | 8/1995 | Seesink et al. |
| 5,442,320 A | 8/1995 | Kunst et al. |
| 5,475,343 A | 12/1995 | Bee |
| 5,491,448 A | 2/1996 | Naokawa et al. |
| 5,497,122 A | 3/1996 | Somayajula |
| 5,497,124 A | 3/1996 | Yamashita et al. |
| 5,504,458 A | 4/1996 | Van Brunt et al. |
| 5,512,857 A | 4/1996 | Koskowich |
| 5,621,357 A | 4/1997 | Botti |
| 5,654,672 A | 8/1997 | Bailey et al. |
| 5,786,731 A | 7/1998 | Bales |
| 5,825,244 A | 10/1998 | Somayajula |
| 5,825,246 A | 10/1998 | Koifman |
| 5,854,573 A | 12/1998 | Chan |
| 5,856,759 A | 1/1999 | Krochmal |
| 5,900,783 A | 5/1999 | Dasgupta |
| 5,963,093 A | 10/1999 | Corsi |
| 5,963,094 A | 10/1999 | Linder et al. |
| 6,037,825 A | 3/2000 | Kung |
| 6,078,220 A | 6/2000 | Bales |
| 6,084,477 A | 7/2000 | Corsi |
| 6,094,571 A | 7/2000 | Groe |
| 6,121,839 A | 9/2000 | Giacomini |
| 6,124,740 A | 9/2000 | Klemmer |
| 6,127,891 A | 10/2000 | Eschauzier |
| 6,154,063 A | 11/2000 | Fang |
| 6,166,503 A | 12/2000 | Korbel et al. |
| 6,188,281 B1 | 2/2001 | Smith et al. |
| 6,194,966 B1 | 2/2001 | Dasgupta |
| 6,255,909 B1 | 7/2001 | Muza |
| 6,259,280 B1 | 7/2001 | Koelling |
| 6,259,745 B1 | 7/2001 | Chan |
| 6,281,751 B1 | 8/2001 | Maulik |
| 6,294,958 B1 | 9/2001 | Eschauzier |
| 6,313,667 B1 | 11/2001 | Eschauzier |
| 6,353,298 B1 | 3/2002 | Jeffrey |
| 6,366,169 B1 | 4/2002 | Ivanov |
| 6,369,553 B1 | 4/2002 | Davis |
| 6,374,043 B1 | 4/2002 | El-Sherif et al. |
| 6,384,585 B2 | 5/2002 | Cusinato et al. |
| 6,417,733 B1 | 7/2002 | Corsi et al. |
| 6,445,530 B1 | 9/2002 | Baker |
| 6,459,338 B1 | 10/2002 | Acosta et al. |
| 6,486,736 B2 | 11/2002 | Cusinato et al. |
| 6,492,870 B2 | 12/2002 | Escobar-Bowser |
| 6,496,067 B1 | 12/2002 | Behzad et al. |
| 6,501,334 B1 | 12/2002 | Corsi et al. |
| 6,529,071 B2 | 3/2003 | Casier et al. |
| 6,535,063 B1 | 3/2003 | Gibson et al. |
| 6,542,032 B2 | 4/2003 | Escobar-Bowser et al. |
| 6,545,538 B1 | 4/2003 | Ivanov et al. |
| 6,553,081 B1 | 4/2003 | Goodson |
| 6,573,795 B2 | 6/2003 | Whitney et al. |
| 6,583,669 B1 | 6/2003 | Eschauzier et al. |
| 6,590,453 B2 | 7/2003 | Tran et al. |
| 6,614,306 B1 | 9/2003 | Morrish |
| 6,624,696 B1 | 9/2003 | Eschauzier et al. |
| 6,710,654 B2 | 3/2004 | Parkhurst et al. |
| 6,720,798 B2 | 4/2004 | Mulder et al. |
| 6,720,817 B2 | 4/2004 | El-Gamal |
| 6,727,758 B2 | 4/2004 | Govil |
| 6,750,716 B2 | 6/2004 | Cusinato et al. |
| 6,784,739 B2 | 8/2004 | Reffay et al. |
| 6,816,014 B2 | 11/2004 | Whitney et al. |
| 6,826,655 B2 | 11/2004 | Arimilli et al. |
| 6,826,658 B1 | 11/2004 | Gaither et al. |
| 6,836,186 B2 | 12/2004 | Lee et al. |
| 6,844,837 B1 | 1/2005 | Sutardja et al. |

OTHER PUBLICATIONS

You, Fan, et al., "Low-Voltage Class AB Buffers with Quiescent Current Control," IEEE Journal of Solid-State Circuits, vol. 33, No. 6, Jun. 1998, pp. 915-920.

Giustolisi, G., et al., "1.2-V CMOS Op-Amp with a Dynamically Biased Output Stage," IEEE Journal of Solid-State Circuits, vol. 35, No. 4, Apr. 2000, pp. 632-636.

CLASS A-B LINE DRIVER FOR GIGABIT ETHERNET

CROSS-REFERENCE TO RELATED APPLICATIONS

This application is a continuation of U.S. application Ser. No. 11/067,749, filed on Mar. 1, 2005, now U.S. Pat. No. 7,839,994, issued Nov. 23, 2010. The disclosure of the above application is incorporated herein by reference.

FIELD

The present invention relates to systems for communicating data via a communication channel. More particularly, the present invention relates to a communication scheme for a class A-B line driver that can be used with, for example, gigabit Ethernet or the like.

BACKGROUND

A gigabit channel is a communication channel with a total data throughput of one gigabit per second. A gigabit channel typically includes four unshielded twisted pairs (hereinafter "UTP") of cables (e.g., Category-5 twisted pair cables) to achieve this data rate. I.E.E.E. Standard 802.3 ab, herein incorporated by reference, describes the specifications for 1000BASE-T twisted-pair gigabit Ethernet. For signal transmission, various types of output stages can be used to drive resistive loads, such as UTPs, for data transmission in accordance with Ethernet network protocols, such as gigabit Ethernet.

For purposes of illustration, FIG. 1A illustrates a simple transmitter 100 for transmitting a differential output current signal, IOUT. The transmitter 100 includes a first current source 102 configured to generate the positive component signal of the differential output current signal. A second current source 104 is configured to generate the negative component signal of the differential output current signal. The transmitter 100 is coupled to an interface circuit 110 for interfacing the transmitter 100 to a UTP 120. The interface circuit 110 can include resistors 112 and 114 arranged in series with a common-mode voltage VCM 116 located between them. The resistors 112 and 114 are arranged in parallel across the primary windings of an isolation transformer 118, with the secondary windings coupled to the UTP 120. The isolation transformer 118 includes a center tap on the primary windings with a DC center tap voltage, VCT 125. In differential mode, IOUT=IOUT+−IOUT−. The magnitude of IOUT depends on the symbol to be transmitted and can vary, for example, from −40 mA to 40 mA (e.g., in 1000BASE-T and 100BASE-TX) and from −100 mA to 100 mA (e.g., in 10BASE-T). A bias or quiescent current, IBIAS, is supplied by bias current supply 127 to bias the first and second current sources 102 and 104, as discussed below.

In 100BASE-T, for example, three transmit symbols are used: {−1, 0, 1}, where a positive pulse represents a "+1," a negative pulse represents a "−1," and the signal represents "0" otherwise. For purposes of illustration, FIG. 1B illustrates a transmit signal, VTX 130, for transmitting the symbol sequence {0, +1, 0, −1}. Several different classes of operation exist for transmitting such signals.

FIG. 1C illustrates an example of class A operation. In class A operation, the output devices conduct for the entire cycle of the output signal. In other words, both output devices conduct continuously for the entire cycle of the output signal. Class A operation typically biases drivers to a certain (large) quiescent or bias current, IBIAS, e.g., IBIAS=40 mA. For purposes of illustration, the transmitter 100 can drive a differential current 140 of 40 mA for class A operation. The center tap current of the transformer 118 will therefore be constant at 40 mA. Consequently, the corresponding common-mode current will not change, resulting in substantially noiseless operation of the transformer 118.

FIG. 1D illustrates an example of class B operation. In class B operation, the output devices conduct for approximately fifty percent of the cycle of the output signal. In other words, each output device is only turned on when it is driving a signal, otherwise it is turned off. Due to this operation, class B operation provides higher efficiency than class A operation, but poor linearity around the crossover region, due to the time it takes to turn one device off and the other device on. The bias current for class B operation is generally very small, being close to zero (and at zero in the ideal case). For purposes of illustration, the transmitter 100 can also drive a differential current 140 of 40 mA for class B operation. However, unlike in class A operation, the center tap current of the transformer 118 will be a transient current of 40 mA for transmitting symbols "+1" and "−1." Consequently, the common-mode current will change on the center tap, thereby inducing electro-magnetic interference (EMI) in the transformer 118. Such EMI will affect transmission of the output signal.

FIG. 1E illustrates an example of class A-B operation. In class A-B operation, the output devices conduct for greater than fifty percent, but less than one hundred percent, of the cycle of the output signal. Both output devices, then, conduct simultaneously for a portion of the cycle of the output signal. In class A-B operation, the drivers are carefully biased just above their fully off state so that the transition between drivers is smoother, thereby causing the output devices to conduct for more than half of, but less than the entire, cycle. Class A-B operation requires more bias current than in equivalent class B operation, but less bias current than in equivalent class A operation. For purposes of illustration, the transmitter 100 can also drive a differential current 140 of 40 mA for class A-B operation. As in class B operation, the center tap current of the transformer 118 will be a transient current for transmitting symbols "+1" and "−1." Consequently, the common-mode current will change on the center tap, inducing EMI in the transformer 118, and again affecting transmission of the output signal.

Consequently, there is a need for a transmission scheme that can make transformer behavior more linear, as well as reduce EMI in the transformer.

SUMMARY OF THE INVENTION

A class A-B differential line driver is disclosed that can be used with, for example, gigabit Ethernet and the like. In accordance with exemplary embodiments of the present invention, according to a first aspect of the present invention, a line driver includes a first driver circuit. The first driver circuit is configured to generate a first component signal of a differential signal at a first polarity. The line driver includes a second driver circuit. The second driver circuit is configured to generate a second component signal of the differential signal at a second polarity. The first and second component signals are biased to form biased first and second component signals. A differential amplitude of a combination of the biased first and second component signals is less than a corresponding differential amplitude of the differential signal. The line driver includes an offset signal circuit in communication with the first and second driver circuits. The offset signal circuit is configured to generate an offset signal for offsetting the biased first and second component signals. A combination of the offset and biased first and second component signals forms the differential signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Other objects and advantages of the present invention will become apparent to those skilled in the art upon reading the following detailed description of preferred

DETAILED DESCRIPTION OF THE PREFERRED EMBODIMENTS

Exemplary embodiments of the present invention are directed to a communication or transmission scheme for a class A-B differential line driver, transmitter, digital-to-analog converter (DAC) or the like that can be used with, for example, gigabit Ethernet or any suitable transmission protocol or network standard. According to exemplary embodiments, an offset current, IOFFSET, is used to offset each of the signal components of a differential output signal in, for example, class A-B operation, in addition to the bias current that is used in such operation, thereby resulting in a higher minimum current. As an additional offset current is used, the maximum amplitude or magnitude of each of the signal components of the differential output signal can be reduced by a proportional amount. The combination of the offset current, bias current and signal components results in a differential signal of a desired differential amplitude (e.g., as that required by the transmission scheme, transmission protocol or network standard). However, because the current level of the signal components has been reduced, the amount of electro-magnetic interference (EMI) induced in the isolation transformer or hybrid (e.g., used for interfacing a transmitter to a communication channel) is reduced by a proportional amount. The transformer core is also biased at a higher minimum current, thereby resulting in behavior that is more linear. Additionally, by taking advantage of the coding scheme used to transmit symbols, the full offset current need not be produced at all times. Thus, exemplary embodiments of the present invention provide a transmission scheme that offers a reduction in EMI in, and an improvement of linear behavior of, a transformer or other suitable hybrid, and allows for an increase in the center tap current of the transformer without a correspondingly large increase in power consumption.

As used herein, a "line driver" can be any suitable type of transmitter or amplifier for transmitting signals via a communication channel. For example, a line driver can be used as a DAC or other like device.

Figure 2:
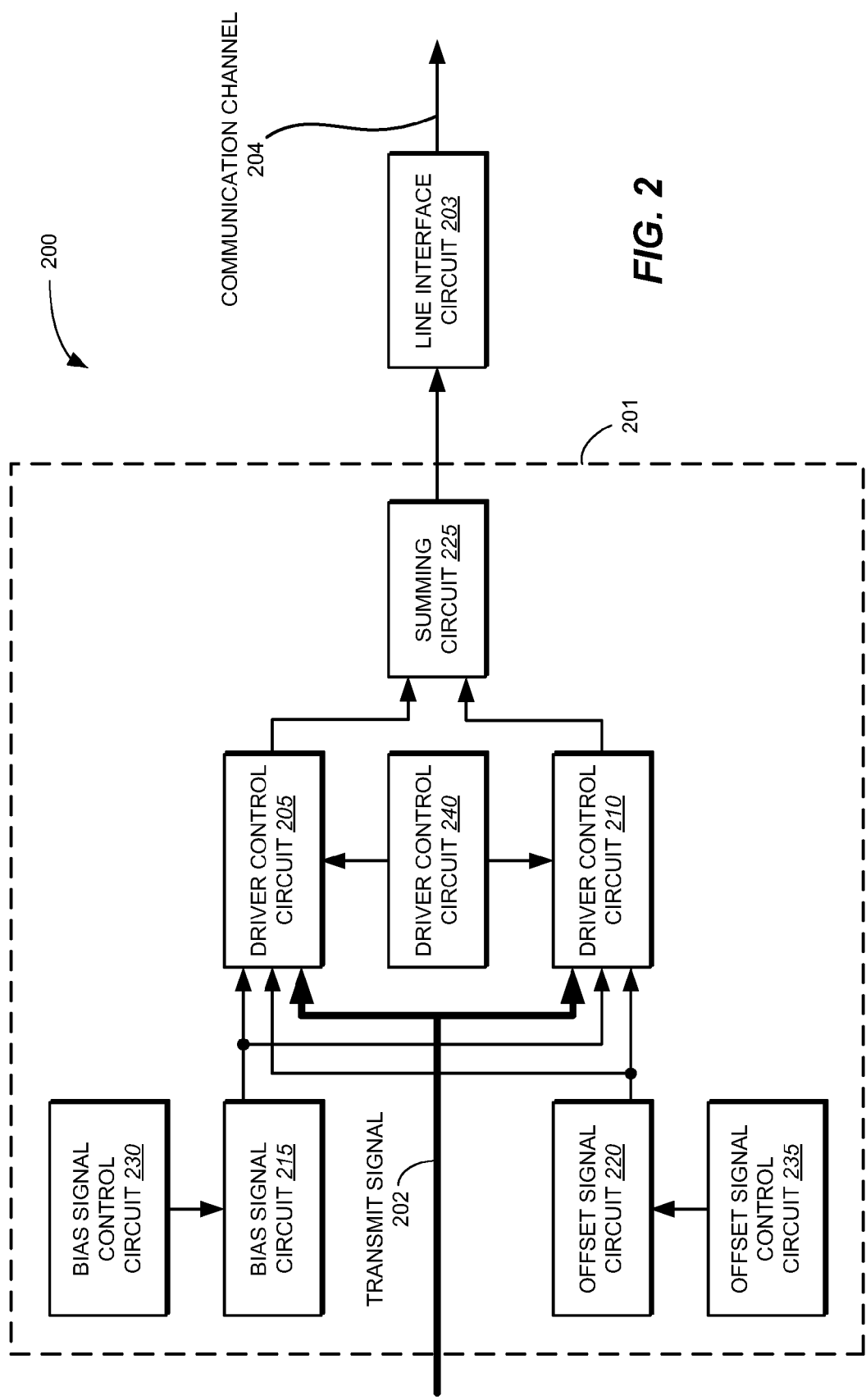
FIG. 2 is a diagram illustrating a signal transmission system, in accordance with an exemplary embodiment of the present invention.

These and other aspects of the present invention will now be described in greater detail. FIG. 2 is a diagram illustrating a signal transmission system 200, in accordance with an exemplary embodiment of the present invention. The signal transmission system 200 includes a line driver 201. The line driver 201 includes a first driver circuit 205. The first driver circuit 205 is configured to receive a transmit signal 202 and to generate a first component signal of a differential transmit signal at a first polarity (e.g., positive or negative polarity). The line driver 201 also includes a second driver circuit 210. The second driver circuit 210 is configured to receive the transmit signal 202 and to generate a second component signal of the differential transmit signal at a second polarity (e.g., a polarity different than the polarity of the first component signal, such as either negative or positive polarity). The signal transmission system 200 can include a line interface circuit 203 in communication with the first and second driver circuits 205 and 210 of line driver 201. The line interface circuit 203 can be configured to interface the line driver 201 to a communication channel 204.

The line driver 201 includes a bias signal circuit 215 in communication with the first and second driver circuits 205 and 210. The bias signal circuit 215 is configured to generate a bias signal for biasing the first and second component signals. The bias signal can be any suitable quiescent or bias current or voltage for biasing the first and second driver circuits 205 and 210, in accordance with the transmission scheme used. For example, for class A-B operation, the bias signal can be approximately five to ten percent of the maximum amplitude of the signal components.

Figure 1A:
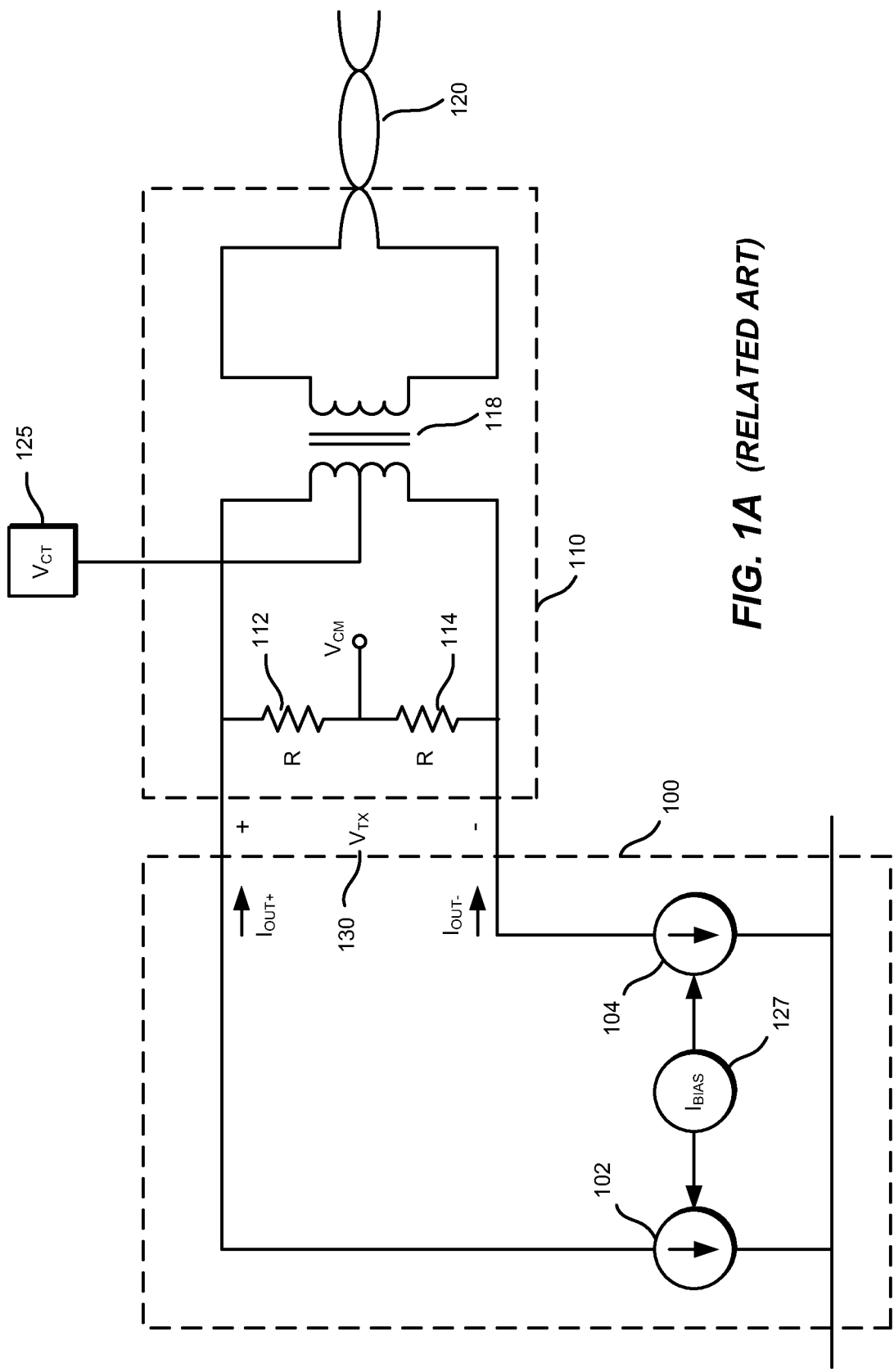
FIG. 1A illustrates a transmitter for transmitting a differential output current signal.
Figure 1B:
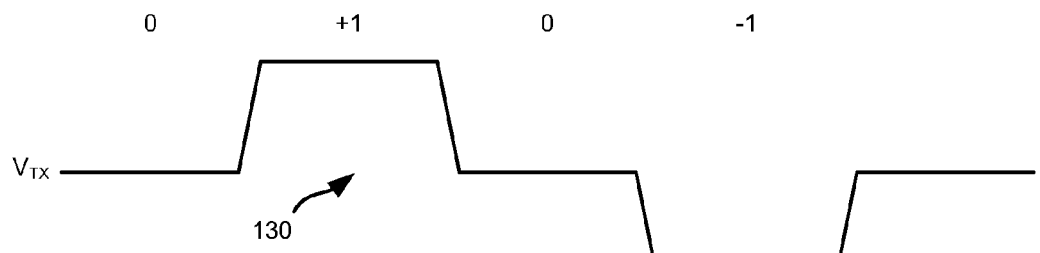
FIG. 1B illustrates a transmit signal for transmitting the symbols {0, +1, −1}.
Figure 1C:
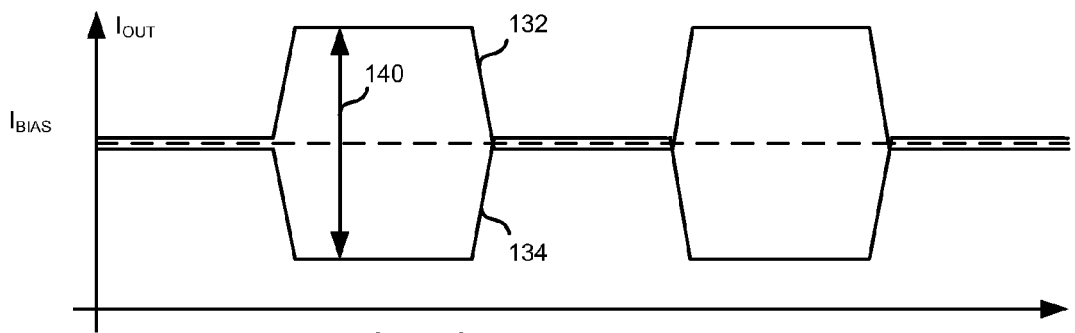
FIG. 1C illustrates an example of class A operation.
Figure 1D:
FIG. 1D illustrates an example of class B operation.
Figure 1E:
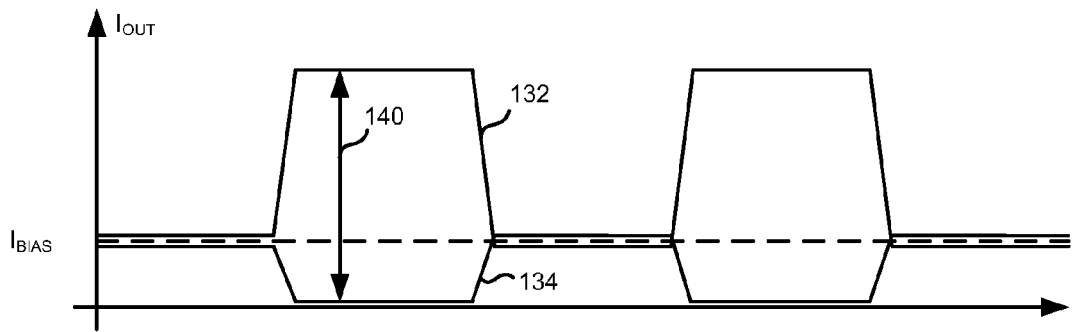
FIG. 1E illustrates an example of class A-B operation.

As discussed previously, FIG. 1E is an illustration of a conventional class A-B differential transmit signal comprised of the biased first and second signal components 132 and 134. For purposes of illustration, the first and second current drivers 205 and 210 can drive a differential current 140 of 40 mA, as used for gigabit Ethernet. Assuming a bias current, IBIAS, of 2 mA, the total differential current 140 would be IOUT=40 mA+2 mA=42 mA for a conventional implementation.

Figure 3A:
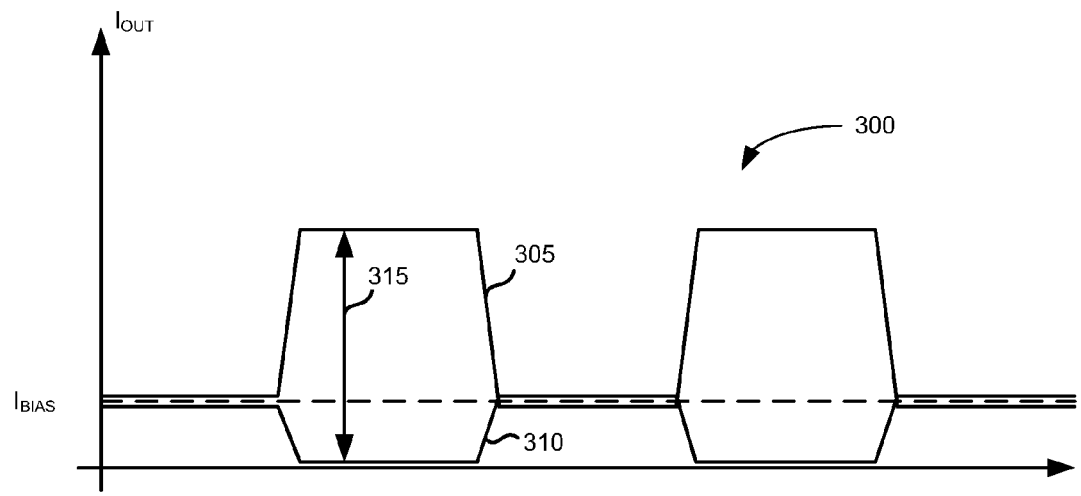
FIG. 3A is an illustration of a class A-B differential transmit signal comprised of biased first and second signal components, in accordance with an exemplary embodiment of the present invention.

However, according to exemplary embodiments, because an additional offset signal is used, the signal levels of the first and second signal components can be reduced. FIG. 3A is an illustration of a class A-B differential transmit signal 300 comprised of biased first and second signal components 305 and 310, in accordance with an exemplary embodiment of the present invention. Continuing with the illustration, a differential amplitude of 40 mA is desired (not including the bias signal, IBIAS), and the transmit signal VTX 130 (illustrated in FIG. 1B) is again used for transmitting symbols. However, the differential amplitude 315 of the combination of the biased first and second component signals 305 and 310 has been reduced to 30 mA, a savings of 10 mA. In other words, the differential amplitude 315 of the combination of the biased first and second component signals 305 and 310 (e.g., 30 mA) is less than the corresponding differential amplitude of the (desired) differential transmit signal (e.g., 40 mA).

Figure 3B:
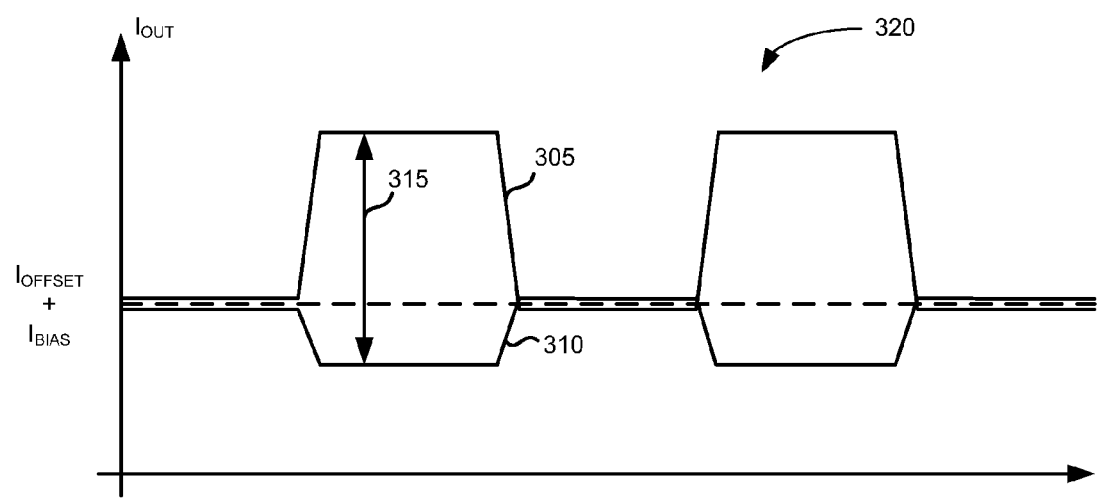
FIG. 3B is an illustration of a class A-B differential transmit signal comprised of offset and biased first and second signal components, in accordance with an exemplary embodiment of the present invention.

According to exemplary embodiments of the present invention, the line driver 201 includes an offset signal circuit 220 in communication with the first and second driver circuits 205 and 210. The offset signal circuit 220 is configured to generate an offset signal for offsetting the biased first and second component signals. The offset signal can be any suitable offset current or voltage for offsetting the biased first and second component signals. The combination of the offset and biased first and second component signals forms the differential transmit signal. The magnitude of the offset signal will depend on the amount of reduction in the signal levels of the first and second component signals 305 and 310. FIG. 3B is an illustration of a class A-B differential transmit signal 320 comprised of offset and biased first and second signal components 305 and 310, in accordance with an exemplary embodiment of the present invention. Continuing with the present illustration, the signal levels of the first and second component signals 305 and 310 have each been reduced by 10 mA, as IOFFSET=10 mA. Assuming IBIAS=2 mA, the differential amplitude of the offset and biased first and second component signals 305 and 310 will be 30 mA+10 mA+2 mA=42 mA, as desired. Other values for the bias and offset signals and signal levels of the component signals can be chosen, depending on, for example, the transmission protocol or network standard used, the class of operation (e.g., the values can be chosen to maintain a particular class of operation), and the like, as the exemplary signals and signal values discussed are for purposes of illustration only and not limitation. For example, the bias signal, IBIAS, can be chosen to appropriately bias the current drivers 205 and 210 for class A-B operation.

In the present illustration, the current level of the component signals has been reduced from 40 mA to 30 mA, a twenty-five percent reduction in current levels. Accordingly, EMI induced in the transformer or hybrid (such as that used in line interface circuit 203) will be proportionally reduced by the same amount (e.g., twenty-five percent). Additionally, as a higher minimum current is being used to bias the transformer (e.g., IOFFSET+IBIAS=10 mA+2 mA=12 mA), the behavior of the transformer will be more linear.

The line driver 201 includes a summing circuit 225 in communication with the first and second driver circuits 205 and 210. The summing circuit 225 is configured to combine the offset and biased first and second component signals to form the differential transmit signal. The line driver 201 can include a bias signal control circuit 230 in communication with the bias signal circuit. The bias signal control circuit 230 is configured to control the bias signal circuit 215 to alter the bias signal, IBIAS, to any desired value. The line driver 201 can include an offset signal control circuit 235 in communication with the offset signal circuit 220. The offset signal control circuit 235 is configured to control the offset signal circuit 220 to alter the offset signal, IOFFSET, to any desired value. Either or both of the bias and offset signals can be varied, depending on, for example, the transmission protocol or network standard and class of operation used. Additionally, the line driver 201 can include a driver control circuit 240 in communication with the first and second driver circuits 205 and 210. The driver control circuit 240 is configured to control generation of the first and second component signals by the first and second driver circuits 205 and 210, respectively, in accordance with, for example, the transmission protocol or network standard used. For example, the driver control circuit 240 can be configured to control each driver circuit by turning each driver circuit on or off to generate the appropriate transmit signal.

Exemplary embodiments of the present invention also provide a power advantage by leveraging the coding scheme used to encode and transmit symbols and other data. In other words, for the given illustration, although an offset signal of 10 mA has been used to boost the minimum current and achieve a differential current of 40 mA, the full offset signal is not required to be produced at all times, because of the coding scheme used. The 100BASE-T and 1000BASE-T network standards will be used to illustrate the advantage.

In 100BASE-T, three transmit symbols are used: {−1, 0, 1}. Such a transmission scheme is illustrated in transmit signal VTX 130 of FIG. 1B. Accordingly, the probability of transmitting a "+1," denoted as "P+1," is 0.25. The probability of transmitting a "0," denoted as "P0," is 0.50. The probability of transmitting a "−1," denoted as "P−1," is 0.25. Therefore, the sum of the probabilities, ΣPi, is 1.00. For the class A-B operation according to exemplary embodiments (assuming 40 mA differential output current, IBIAS=2 mA, and IOFFSET=10 mA), the average current through the transformer is given by Equation (1), as follows:

$$IAVE = I + 1 * P + 1 + I0 * P0 + I - 1 * P - 1 = \qquad (1)$$
$$(42\ mA) * (0.25) + (10\ mA) * (0.5) + (42\ mA) * (0.25) = 26\ mA$$

For class A operation, the average current through the transformer is given by Equation (2), as follows:

$$IAVE = 40\ mA + 2\ mA = 42\ mA \qquad (2)$$

For class B operation, the average current through the transformer is given by Equation (3), as follows:

$$IAVE = I + 1 * P + 1 + I0 * P0 + I - 1 * P - 1 = \qquad (3)$$
$$(42\ mA) * (0.25) + (2\ mA) * (0.5) + (42\ mA) * (0.25) = 22\ mA$$

As can be seen by comparing Equations (1) and (3), adding an offset signal of 10 mA (in the class A-B operation) increases the average current by 26 mA−22 mA=4 mA, when compared with the class B operation. Thus, the transformer is conducting only 40% of the added offset signal.

Figure 4:
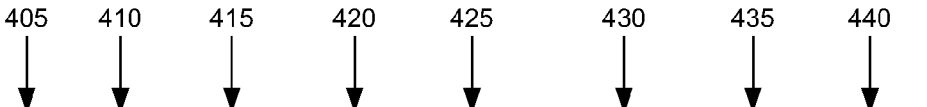
FIG. 4 is a chart illustrating the comparison of average current for class A-B operation and class B operation for 1000BASE-T, in accordance with an exemplary embodiment of the present invention.

FIG. 4 is a chart illustrating the comparison of average current for class A-B operation and class B operation for 1000BASE-T, in accordance with an exemplary embodiment of the present invention. 1000BASE-T comprises seventeen transmit symbol levels. The signal level for each transmit symbol is given in column 405. The corresponding offset signal added to the signal levels according to exemplary embodiments is given in column 410. The probability of transmitting each symbol is given in column 415. Column 420 indicates the product of the probability of transmitting a symbol (from column 415) and the signal level of the symbol (from column 405) for each symbol in class B operation. The total average current for class B operation (assuming a bias signal, IBIAS, of 2 mA) is 19.2 mA+2 mA=21.2 mA. Column 425 indicates the product of the probability of transmitting a symbol (from column 415) and the signal level of the symbol with the corresponding offset signal (i.e., the addition of columns 405 and 410) for each symbol in the class A-B operation according to exemplary embodiments. The total average current for class A-B operation is 25.4 mA. Thus, adding the offset signals for class A-B operation increases the average current by 25.4 mA−21.2 mA=4.2 mA, when compared with class B operation.

When no data is being communicated, idle data is transmitted as an indication that the communication link is up. Columns 430, 435 and 440 of FIG. 4 illustrate the comparison of average current for class A-B operation and class B operation for 1000BASE-T for transmission of such idle data, in accordance with an exemplary embodiment of the present invention. The probability of transmitting each symbol of the idle data is given in column 430. Column 435 indicates the product of the probability of transmitting a symbol (from column 430) and the signal level of the symbol (from column 405) for each such transmitted symbol in class B operation. The total average current for class B operation (assuming a bias signal, IBIAS, of 2 mA) is 17.5 mA+2 mA=19.5 mA. Column 440 indicates the product of the probability of transmitting a symbol (from column 430) and the signal level of the symbol with the corresponding offset signal (i.e., the addition of columns 405 and 410) for each such transmitted symbol in the class A-B operation according to exemplary embodiments. The total average current for class A-B operation is 24.0 mA. Thus, adding the offset signals for class A-B operation increases the average current by 24.0 mA−19.5 mA=4.5 mA, when compared with class B operation.

As these examples illustrate, the total power consumption will increase by a fraction of the increase in the center tap current. In other words, exemplary embodiments of the present invention can provide for an increase in the center tap current of the transformer without a corresponding increase in power consumption.

Other configurations of line driver 201 can be used. For example, first and second driver circuits 205 and 210 can feed into offset signal circuit 220 for the offset signal. The summing circuit 225 can form part of the line interface circuit 203, rather than a portion of the line driver 201. Alternatively, the bias signal control circuit 230, offset signal control circuit 235 and driver transmission control circuit 240 can be located remotely from line driver 201 (e.g., off chip), with the appropriate control signals supplied to the line driver 201. Additionally, the control functions provided by these control circuits can be combined into a single control circuit or fewer control circuits than three. Other configurations can also be used.

Figure 5:
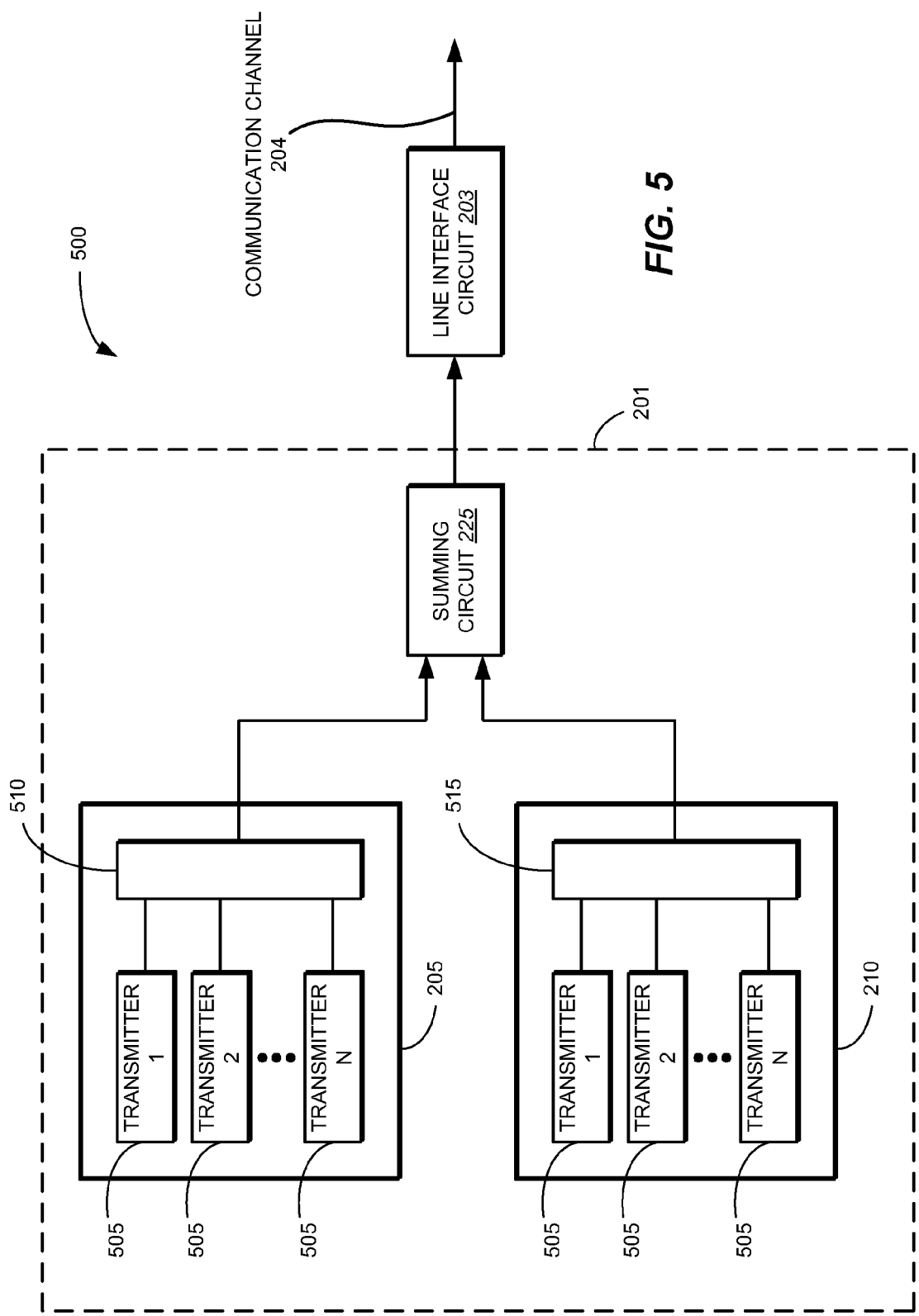
FIG. 5 illustrates a signal transmission system 500, in accordance with an alternative exemplary embodiment of the present invention.

For example, each of the first and second driver circuits 205 and 210 can be comprised of first and second sets of transmitters, respectively. FIG. 5 illustrates a signal transmission system 500, in accordance with an alternative exemplary embodiment of the present invention. In FIG. 5, the bias signal circuit 215, offset signal circuit 220, bias signal control circuit 230, offset signal control circuit 235, and driver control circuit 240 and the connections between and signals passed among those elements and first and second driver circuits 205 and 210 are identical to those as illustrated in FIG. 2 and as discussed above, and have not been included in FIG. 5 merely for purposes of clarity.

As illustrated in FIG. 5, each of the first and second driver circuits 205 and 210 can be comprised of N transmitters 505, where N can be any suitable number, and can be a different number for each of the driver circuits. Each of the transmitters 505 can be comprised of, for example, a current source or the like. The first set of transmitters 505 can be configured to generate the first component signal of the differential transmit signal at the first polarity. The second set of transmitters 505 can be configured to generate the second component signal of the differential transmit signal at the second polarity. According to the alternative exemplary embodiment, an output of a set of transmitters 505 comprises a combination of outputs of transmitters 505 within the set. Accordingly, each of the first and second sets of transmitters 505 can include a respective summing circuit (510 and 515) for combining the outputs of the transmitters 505 within each set. The first and second component signals can be biased and offset in a manner according to exemplary embodiments. The summing circuit 225 can then combine the offset and biased first and second component signals from the first and second sets of transmitters 505, respectively, to form the differential transmit signal. Alternatively, the summing circuit 225 can perform the combination of the outputs of the transmitters 505 within each set, so that summing circuits 510 and 515 can be eliminated.

Figure 6:
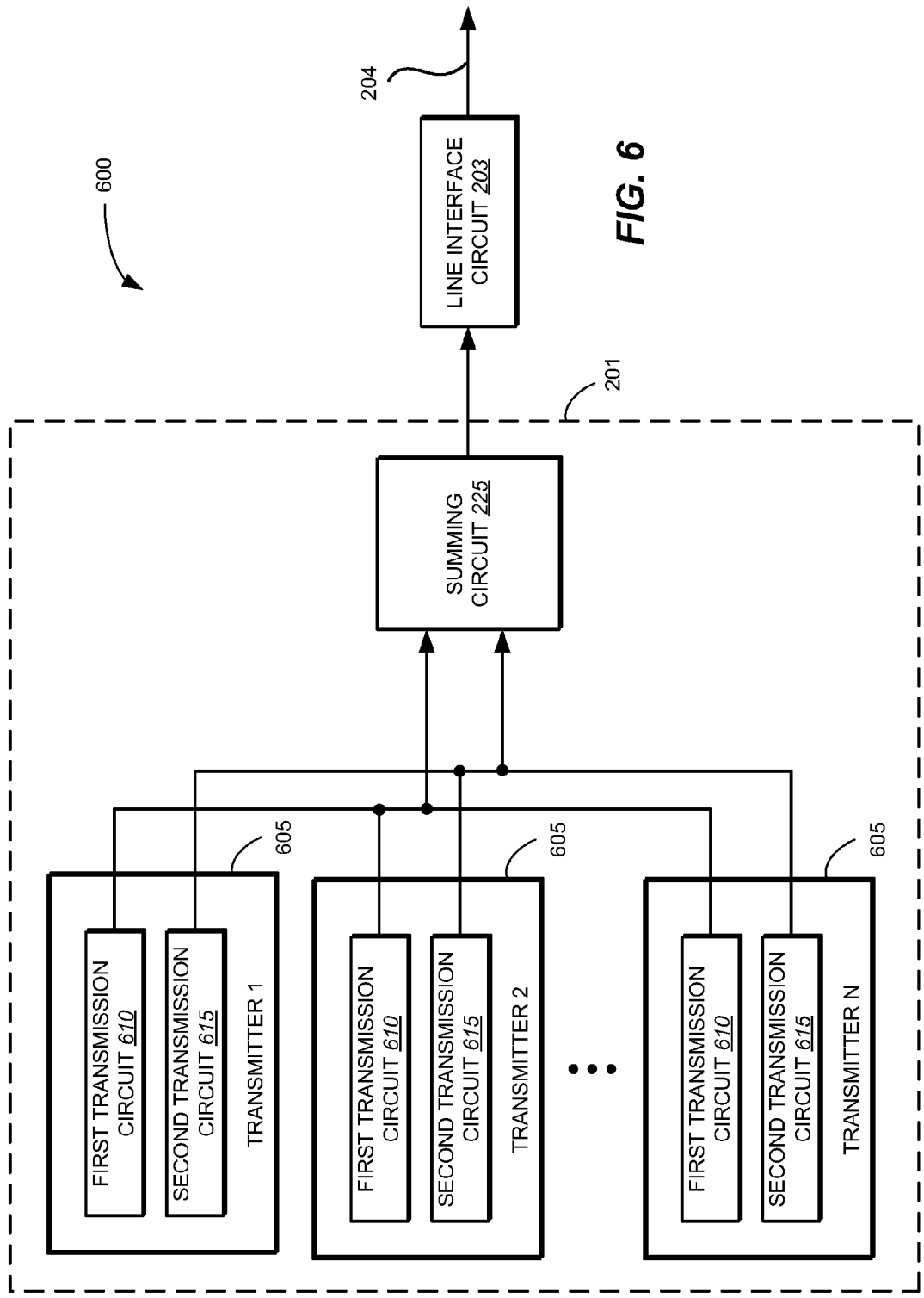
FIG. 6 illustrates a signal transmission system 600, in accordance with an alternative exemplary embodiment of the present invention.

Alternatively, the first and second driver circuits 205 and 210 can be replaced with a plurality of transmitters, with each transmitter comprised of a first driver circuit and a second driver circuit. FIG. 6 illustrates a signal transmission system 600, in accordance with an alternative exemplary embodiment of the present invention. In FIG. 6, the bias signal circuit 215, offset signal circuit 220, bias signal control circuit 230, offset signal control circuit 235, and driver control circuit 240 and the connections between and signals passed among those elements and the various first and second driver circuits are identical to those as illustrated in FIG. 2 and as discussed above, and have not been included in FIG. 6 merely for purposes of clarity.

As illustrated in FIG. 6, N transmitters 605 can be used, where N can be any suitable number. Each transmitter 605 can be comprised of a first transmission circuit 610 and a second transmission circuit 615. Each of the first and second transmission circuits 610 and 615 can be comprised of any suitable signal driver, such as, for example, a current source or the like. The first transmission circuit 610 of each transmitter 605 can be configured to generate a first component signal of the differential transmit signal at a first polarity. The second transmission circuit 615 of each transmitter 605 can be configured to generate a second component signal of the differential transmit signal at the second polarity. The first component signals from each of the first transmission circuits 610 can be combined to form a first accumulated component signal. The second component signals from each of the second transmission circuits 615 can be combined to form a second accumulated component signal. Summing circuits can be used to combine the first and second component signals to form the first and second accumulated component signals, respectively. The first and second accumulated component signals can be biased and offset in a manner according to exemplary embodiments. The summing circuit 225 can then combine the offset and biased first and second accumulated component signals to form the differential transmit signal. Alternatively, the summing circuit 225 can perform the combination of the respective outputs of each of the first and second transmission circuits 610 and 615 within each of the transmitters 605, so that the aforementioned summing circuits can be eliminated.

First and second current drivers 205 and 210, bias signal circuit 215, offset signal circuit 220, summing circuit 225, bias signal control circuit 230, and offset signal control circuit 235 can each be implemented using any suitable electrical or electronic device capable of performing the functions associated with the respective element. For example, first and second current drivers 205 and 210 can each comprise a current source or any other suitable electrical device capable of generating a component signal of a differential transmit signal at a given polarity. For example, the offset signal circuit 220 can be comprised of a voltage follower in combination with a bias resistor that develops a stable reference current through one leg of a current mirror. The stable reference current can be mirrored to an output current (IOFFSET) having a particular value defined by the stable reference current and the transistor geometries of the devices defining the current mirror. Other implementations and configurations of the respective elements can be used.

Additionally, first and second current drivers 205 and 210, bias signal circuit 215, offset signal circuit 220, summing circuit 225, bias signal control circuit 230, and offset signal control circuit 235 can be formed on a monolithic substrate. In other words, the elements of the line driver can be constructed of common integrated circuit elements and can be implemented on a single chip along with the remaining components of, for example, a high speed bidirectional communication transceiver or the like. In accordance with an exemplary embodiment of the present invention, the transformer or hybrid portion of the line interface circuit 203 is contemplated as an off-chip circuit element. Even though the exemplary embodiment contemplates the transformer being provided off-chip, it will be understood by skilled artisans familiar with integrated circuit design and fabrication that suitable transformers can be constructed from integrated circuit elements, such as combinations of spiral inductors and the like, and still provide sufficient DC coupling between the communication channel 204 and an integrated circuit transceiver.

While the line driver has been described in terms of integrated circuit technology implementing, for example, a gigabit-type multi-pair Ethernet transceiver or the like, it will be evident to one having ordinary skill in the art that the invention can be suitably implemented in other semiconductor technologies, such as bipolar, bi-CMOS, and the like, as well as be portable to other forms of bidirectional communication devices that operate in, for example, full duplex mode. According to an alternative exemplary embodiment, each component or device of line driver can be formed on, for example, a separate substrate and can be in communication with another component or device using any appropriate type of electrical connection that is capable of carrying electrical information. In other words, the circuitry according to the present invention can be constructed from discrete components as opposed to a monolithic circuit.

The line driver according to exemplary embodiments can be compatible with any suitable wired or wireless transmission protocol or network standard, such as, for example, 10BASE-T, 100BASE-T, 100BASE-TX, 1000BASE-T, 10 GBASE-T or the like. For example, the line driver can be configurable to accommodate both 1.0 V output swings characteristic of 1000BASE-T operation and 2.5 V output swings characteristic of 10BASE-T operation. For example, in 1000BASE-T (gigabit Ethernet), the differential transmit signal can comprise a gigabit Ethernet signal. The line interface circuit 203 can be any suitable type of interface circuit capable of interfacing the line driver with the communication channel 204, such as the interface circuit 110 illustrated in FIG. 1A or the like. The communication channel 204 can be any suitable type of communication channel capable of transmitting electrical information, such as a UTP or any other suitable wired or wireless communication channel.

Figure 7:
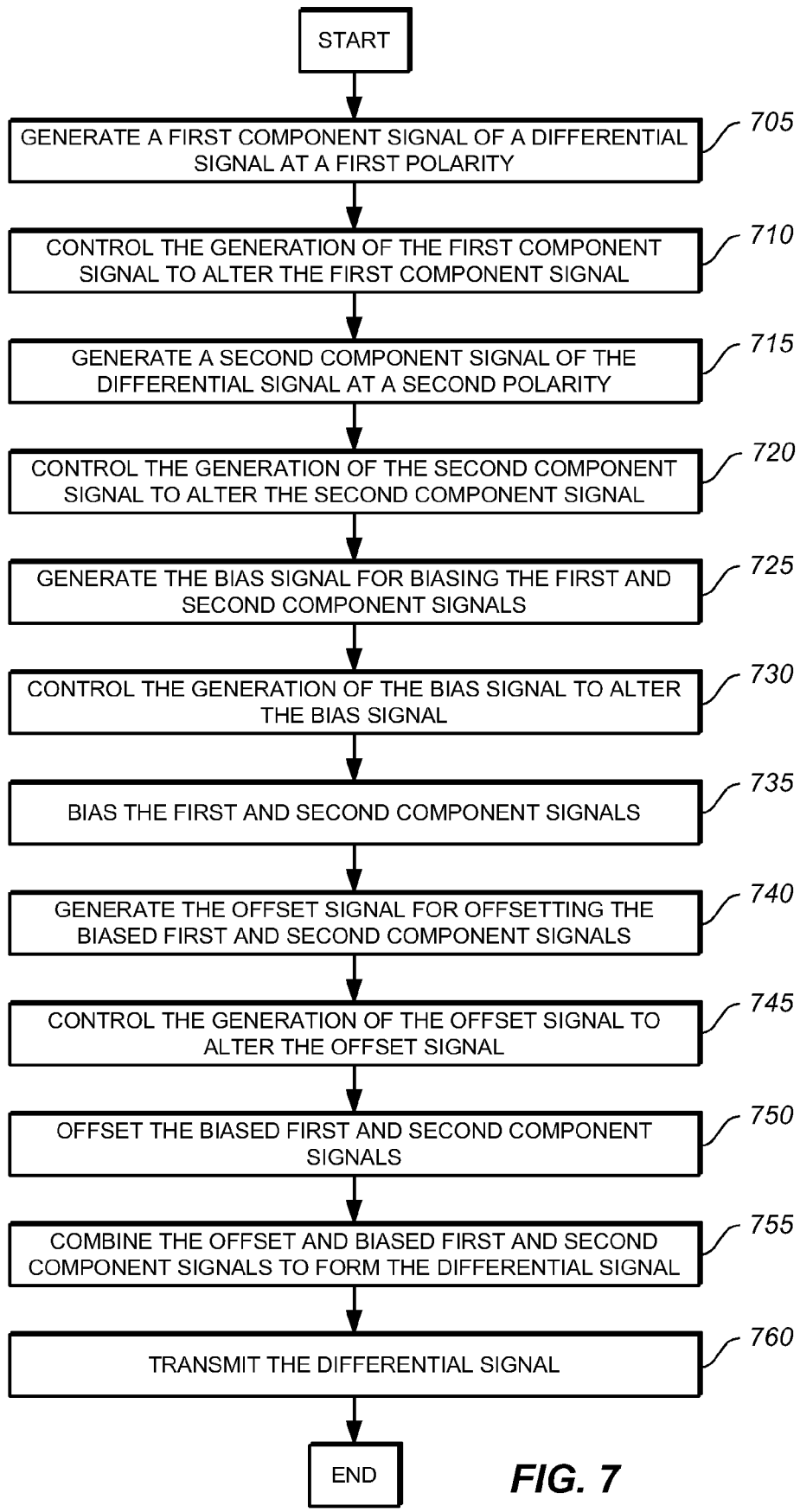
FIG. 7 is a flowchart illustrating steps for transmitting information, in accordance with an exemplary embodiment of the present invention.

FIG. 7 is a flowchart illustrating steps for communicating information, in accordance with an exemplary embodiment of the present invention. In step 705, a first component signal of a differential signal is generated at a first polarity. Optionally, in step 710, the generation of the first component signal can be controlled to alter the first component signal. In step 715, a second component signal of the differential signal is generated at a second polarity. Optionally, in step 720, the generation of the second component signal can be controlled to alter the second component signal. In step 725, a bias signal is generated for biasing the first and second component signals. Optionally, in step 730, the generation of the bias signal can be controlled to alter the bias signal. In step 735, the first and second component signals are biased using the bias signal. The differential amplitude of the combination of the biased first and second component signals is less than a corresponding differential amplitude of the differential signal. In step 740, the offset signal is generated for offsetting the biased first and second components signals. Optionally, in step 745, the generation of the offset signal can be controlled to alter the offset signal. In step 750, the biased first and second component signals are offset using the offset signal. In step 755, the offset and biased first and second component signals are combined to form the differential signal. In step 760, the differential signal is transmitted via a communication channel.

Figure 8:
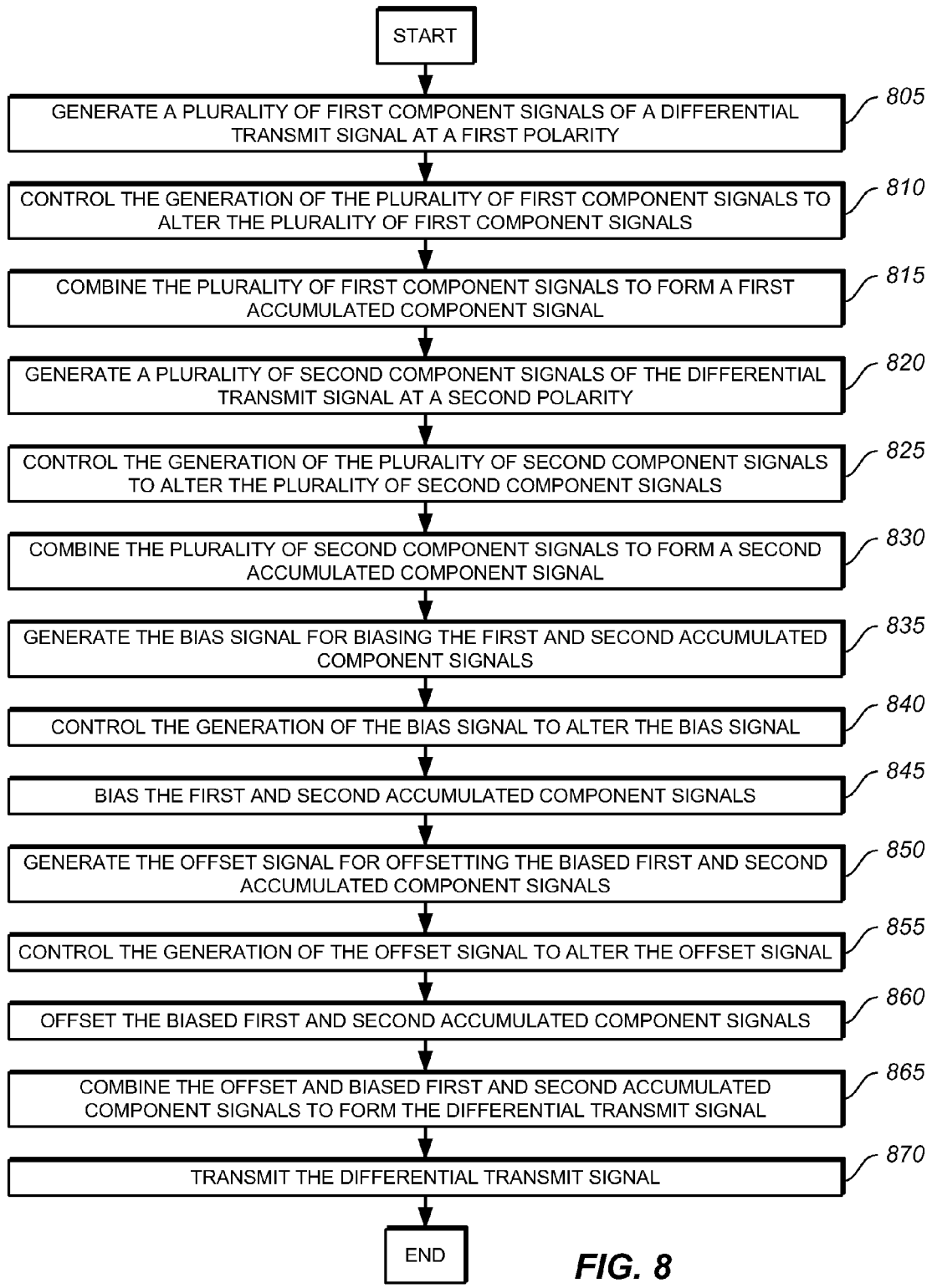
FIG. 8 is a flowchart illustrating steps for transmitting information, in accordance with an alternative exemplary embodiment of the present invention.

FIG. 8 is a flowchart illustrating steps for communicating information, in accordance with an alternative exemplary embodiment of the present invention. In step 805, a plurality of first component signals of a differential transmit signal are generated at a first polarity. Optionally, in step 810, the generation of the plurality of first component signals can be controlled to alter the plurality of first component signals. In step 815, the plurality of first component signals are combined to form a first accumulated component signal. In step 820, a plurality of second component signals of the differential transmit signal are generated at a second polarity. Optionally, in step 825, the generation of the plurality of second component signals can be controlled to alter the plurality of second component signals. In step 830, the plurality of second component signals are combined to form a second accumulated component signal. In step 835, the bias signal is generated for biasing the first and second accumulated component signals. Optionally, in step 840, the generation of the bias signal can be controlled to alter the bias signal. In step 845, the first and second accumulated component signals are biased using the bias signal. The differential amplitude of the combination of the biased first and second accumulated component signals is less than a corresponding differential amplitude of the differential transmit signal. In step 850, the offset signal is generated for offsetting the biased first and second accumulated component signals. Optionally, in step 855, the generation of the offset signal can be controlled to alter the offset signal. In step 860, the biased first and second accumulated component signals are offset using the offset signal. In step 865, the offset and biased first and second accumulated component signals are combined to form the differential transmit signal. In step 870, the differential transmit signal is transmitted via a communication channel.

According to exemplary embodiments, the method of communicating information illustrated in FIGS. 7 and 8 can be compatible with any suitable wired or wireless transmission protocol or network standard, including, for example, 10BASE-T, 100BASE-T, 100BASE-TX, 1000BASE-T, 10 GBASE-T or the like.

Exemplary embodiments of the present invention can be used in any suitable application or system capable of communicating information, such as any appropriate form of transmitter or transceiver. For example, the line driver 201 illustrated in FIG. 2 can be used in any suitable application where a DAC is utilized as a line driver. For example, exemplary embodiments of the present invention can be used with the class B driver disclosed in U.S. Pat. No. 6,844,837, the entire contents of which are hereby incorporated by reference herein. The line driver 201 can also form part of an Ethernet controller or transceiver or the like.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A line driver comprising:
   a first driver circuit configured to
      receive a first transmit signal, and
      generate a first component signal having a first polarity based on (i) the first transmit signal, (ii) a bias signal, and (iii) an offset signal;
   a second driver circuit configured to
      receive a second transmit signal, and
      generate a second component signal having a second polarity based on (i) the second transmit signal, (ii) the bias signal, and (iii) the offset signal, wherein the second polarity is different than the first polarity; and
   a first summing circuit configured to sum the first component signal and the second component signal to generate a first differential signal,
   wherein a first average current of the first differential signal for a plurality of symbols is greater than a second average current of a second differential signal for the plurality of symbols,
   wherein the second differential signal is generated by summing a first biased signal and a second biased signal, and
   wherein the first biased signal is generated by biasing the first transmit signal based on the bias signal, and wherein the second bias signal is generated by biasing the second transmit signal based on the bias signal.

2. The line driver of claim 1, further comprising:
   a bias signal circuit configured to generate the bias signal; and
   an offset signal circuit configured to generate the offset signal.

3. The line driver of claim 1, wherein the plurality of symbols include 0, 1, and −1.

4. The line driver of claim 1, wherein the first average current and the second average current are each associated with 0, 1, −1 symbols.

5. The line driver of claim 1, wherein:
   a maximum amplitude of the first biased signal and the second biased signal is reduced to generate the first component signal and the second component signal; and
   the reduction in the maximum amplitude is equal to a current level of the offset signal.

6. The line driver of claim 1, wherein a minimum current level of the first component signal and the second component signal is equal to a current level of the bias signal.

7. The line driver of claim 1, wherein a first differential amplitude of the first differential signal is equal to a second differential amplitude of the second differential signal.

8. The line driver of claim 1, wherein:
   the first average current is determined based on weighted current levels of the first differential signal for the plurality of symbols; and
   the second average current is determined based on weighted current levels of the second differential signal for the plurality of symbols.

9. The line driver of claim 1, wherein:
   the first driver circuit is configured to generate the first component signal by reducing a current level of the first transmit signal (i) by a predetermined amount during transmission of a first one of the plurality of symbols and (ii) relative to a sum of a first current level and a second current level;
   the first current level is a current level of the bias signal; and
   the second current level is a current level of the offset signal.

10. The line driver of claim 9, wherein the first driver circuit is configured to generate the first component signal by not reducing a current level of the first biased signal (i) by the predetermined amount during transmission of a second one of the plurality of symbols and (ii) relative to the sum of the first current level and the second current level.

11. The line driver of claim 1, wherein a maximum current amplitude of the first differential signal is less than a maximum current amplitude the second differential signal.

12. The line driver of claim 1, wherein:
   a current level of the first biased signal is greater than a current level of the first component signal relative to a sum of a first current level and a second current level;
   the first current level is a current level of the bias signal; and
   the second current level is a current level of the offset signal.

13. The line driver of claim 1, wherein:
   a magnitude of the second differential signal for one of the plurality of symbols is increased from a first magnitude to a second magnitude when generating the first differential signal;
   the first magnitude is less than a sum of a first current level and a second current level;
   the second magnitude is greater than the sum of a first current level and a second current level;
   the first current level is a current level of the bias signal; and
   the second current level is a current level of the offset signal.

14. The line driver of claim 1, wherein a difference between the first average current and the second average current is less than a current level of the offset signal.

15. The line driver of claim 1, wherein the bias signal and the offset signal are current bias signals.

16. The line driver of claim 1, wherein the line driver comprises a class A-B differential line driver circuit.

17. The line driver of claim 1, wherein:
   the first driver circuit comprises a first plurality of transmitters; and
   the second driver circuit comprises a second plurality of transmitters.

18. The line driver of claim 17, wherein:
   the first driver circuit comprises a second summing circuit configured to sum outputs of the first plurality of transmitters;
   the second driver circuit comprises a third summing circuit configured to sum outputs of the second plurality of transmitters; and
   the first summing circuit sums outputs of the second summing circuit and the third summing circuit.

19. The line driver of claim 1, further comprising:
a plurality of the first driver circuit;
a plurality of the second driver circuit; and
a plurality of transmitters, wherein each of the plurality of transmitters comprises
one of the first driver circuits, and
one of the second driver circuits.

20. The line driver of claim 19, wherein the first summing circuit sums:
a first combination of outputs of the plurality of first driver circuits; and
a second combination of outputs of the plurality of second driver circuits.

\* \* \* \* \*